United States Patent
Turnquist et al.

(10) Patent No.: US 12,163,352 B2
(45) Date of Patent: Dec. 10, 2024

(54) METHOD FOR MANUFACTURING A TELESCOPING WIND TURBINE TOWER STRUCTURE

(71) Applicant: General Electric Company, Schenectady, NY (US)

(72) Inventors: Norman Arnold Turnquist, Carlisle, NY (US); Vitali Victor Lissianski, Schenectady, NY (US); Biao Fang, Clifton Park, NY (US); Gregory Edward Cooper, Greenfield Center, NY (US); Pascal Meyer, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 776 days.

(21) Appl. No.: 17/279,314

(22) PCT Filed: Sep. 28, 2018

(86) PCT No.: PCT/US2018/053457
§ 371 (c)(1),
(2) Date: Mar. 24, 2021

(87) PCT Pub. No.: WO2020/068119
PCT Pub. Date: Apr. 2, 2020

(65) Prior Publication Data
US 2021/0396034 A1     Dec. 23, 2021

(51) Int. Cl.
*F03D 13/20*     (2016.01)
*B28B 1/00*     (2006.01)
(Continued)

(52) U.S. Cl.
CPC ........... *E04H 12/344* (2013.01); *B28B 1/001* (2013.01); *B28B 23/02* (2013.01); *B33Y 10/00* (2014.12);
(Continued)

(58) Field of Classification Search
CPC ....... Y02E 10/72; Y02E 10/728; F03D 13/20; F03D 13/10; E04H 12/342; E04H 12/344
See application file for complete search history.

(56) References Cited

U.S. PATENT DOCUMENTS 3,028,707 A * 4/1962 Sagalovitch .......... E04B 1/3511
                                                    52/125.1
3,564,567 A * 2/1971 Mladyenovitch ..... E01D 21/105
                                                    14/7
(Continued)

FOREIGN PATENT DOCUMENTS

EP     2735674 A1     5/2014
EP     3118394 A1     1/2017
(Continued)

OTHER PUBLICATIONS

First Examination Report for IN application No. 202117012949, mail date Aug. 30, 2022.
(Continued)

*Primary Examiner* — Brian E Glessner
*Assistant Examiner* — Daniel J Kenny
(74) *Attorney, Agent, or Firm* — Dority & Manning, P.A.

(57) ABSTRACT

A method for manufacturing a tower structure of a wind turbine includes printing, via an additive printing device, a plurality of concentric sections of the tower structure of the wind turbine. The concentric sections may be printed simultaneously from concrete, may include tensioning cables or other structural supports, and may define other support flanges or overhangs. After curing, the method may include
(Continued)

raising an inner section of the plurality of concentric sections to a top of an adjacent outer section and joining the two sections. This process may be repeated to telescope the concentric sections and raise the tower structure.

14 Claims, 7 Drawing Sheets

(51) Int. Cl.
    *B28B 23/02*     (2006.01)
    *B33Y 10/00*     (2015.01)
    *B33Y 80/00*     (2015.01)
    *E04H 12/12*     (2006.01)
    *E04H 12/16*     (2006.01)
    *E04H 12/34*     (2006.01)

(52) U.S. Cl.
    CPC .............. *B33Y 80/00* (2014.12); *E04H 12/12* (2013.01); *E04H 12/16* (2013.01); *E04H 12/341* (2013.01); *F03D 13/20* (2016.05); *F05B 2240/9151* (2013.01)

(56) References Cited

U.S. PATENT DOCUMENTS

| | | | |
|---|---|---|---|
| 3,968,191 A * | 7/1976 | Stegmeier | E04H 4/141 |
| | | | 264/34 |
| 5,038,540 A | 8/1991 | Krautz | |
| 7,765,766 B2 | 8/2010 | Gomez et al. | |
| 7,866,121 B2 | 1/2011 | Polyzois et al. | |
| 8,256,174 B2 | 9/2012 | Irniger et al. | |
| 8,474,221 B1 * | 7/2013 | Ceko | E04H 12/02 |
| | | | 52/843 |
| 8,573,950 B2 | 11/2013 | Yokoyama et al. | |
| 8,826,614 B2 | 9/2014 | Garcia Maestre et al. | |
| 8,834,072 B1 * | 9/2014 | Donald | E04G 13/00 |
| | | | 52/126.5 |
| 8,919,074 B2 | 12/2014 | Meyer et al. | |
| 9,127,650 B2 | 9/2015 | Moestrup et al. | |
| 9,850,674 B1 | 12/2017 | Paura et al. | |
| 10,486,330 B2 * | 11/2019 | Giles | B28B 3/20 |
| 2003/0147753 A1 | 8/2003 | Ollgaard | |
| 2005/0194401 A1 | 9/2005 | Khoshnevis | |
| 2008/0209842 A1 | 9/2008 | Montaner Fraguet et al. | |
| 2008/0256892 A1 | 10/2008 | Franke | |
| 2009/0025304 A1 | 1/2009 | Irniger et al. | |
| 2009/0051062 A1 | 2/2009 | Wilkinson | |
| 2010/0112119 A1 | 5/2010 | Khoshnevis | |
| 2011/0107708 A1 | 5/2011 | Holscher | |
| 2012/0137623 A1 | 6/2012 | Haridasu et al. | |
| 2012/0311948 A1 | 12/2012 | Hangel | |
| 2012/0317918 A1 | 12/2012 | Rasmussen et al. | |
| 2013/0000241 A1 | 1/2013 | Jensen et al. | |
| 2013/0001954 A1 | 1/2013 | Garcia Maestre et al. | |
| 2013/0239490 A1 | 9/2013 | Peng et al. | |
| 2014/0059957 A1 | 3/2014 | Stark | |
| 2014/0061974 A1 | 3/2014 | Tyler | |
| 2014/0311085 A1 | 10/2014 | Fernandez Gomez et al. | |
| 2014/0348662 A1 | 11/2014 | Schibsbye | |
| 2014/0374933 A1 | 12/2014 | Flitsch et al. | |
| 2015/0025282 A1 | 1/2015 | Yang et al. | |
| 2015/0239178 A1 | 8/2015 | Armstrong | |
| 2015/0300036 A1 | 10/2015 | Khoshnevis | |
| 2016/0001461 A1 | 1/2016 | Gardiner et al. | |
| 2016/0032586 A1 | 2/2016 | Radford | |
| 2016/0032610 A1 | 2/2016 | Arlaban Gabeiras et al. | |
| 2016/0263822 A1 | 9/2016 | Boyd, IV | |
| 2016/0271876 A1 | 9/2016 | Lower | |
| 2017/0016244 A1 * | 1/2017 | Keller | E04G 21/0463 |
| 2017/0030102 A1 | 2/2017 | Pedersen | |
| 2017/0203515 A1 | 7/2017 | Bennett et al. | |
| 2017/0216918 A1 | 8/2017 | Orme-Marmarelis | |
| 2017/0218652 A1 | 8/2017 | Neighbours | |
| 2017/0283297 A1 | 10/2017 | Kulmagambetov | |
| 2017/0314285 A1 | 11/2017 | Dobrusky et al. | |
| 2018/0036946 A1 | 2/2018 | Barton et al. | |
| 2018/0056607 A1 | 3/2018 | Socha-Leialoha | |
| 2018/0071949 A1 | 3/2018 | Giles | |
| 2018/0080647 A1 | 3/2018 | Abbasi et al. | |
| 2018/0117822 A1 | 5/2018 | McGee et al. | |
| 2018/0345533 A1 | 12/2018 | Hernandez et al. | |
| 2019/0010722 A1 | 1/2019 | Lockwood et al. | |
| 2019/0105840 A1 | 4/2019 | Chung | |
| 2019/0136566 A1 | 5/2019 | Viselli et al. | |
| 2019/0186166 A1 | 6/2019 | Garduno Estebanez et al. | |
| 2019/0247645 A1 | 8/2019 | Walker et al. | |
| 2019/0292803 A1 | 9/2019 | Meyer et al. | |
| 2021/0115903 A1 * | 4/2021 | Ventura Garcia | E04H 12/085 |

FOREIGN PATENT DOCUMENTS

| | | |
|---|---|---|
| JP | 2007070884 A | 3/2007 |
| JP | 4701047 B2 | 6/2011 |
| JP | 2015/217682 A | 12/2015 |
| WO | WO2007/050972 A2 | 5/2007 |
| WO | WO2013/120889 A1 | 8/2013 |
| WO | WO2016/033859 A1 | 3/2016 |
| WO | WO2016/119035 A1 | 8/2016 |
| WO | WO2016/134478 A1 | 9/2016 |
| WO | WO2017/046624 A1 | 3/2017 |
| WO | WO2017/092764 A1 | 6/2017 |
| WO | WO2017/131953 A1 | 8/2017 |
| WO | WO2017/181060 A1 | 10/2017 |
| WO | WO2018/136475 A1 | 7/2018 |

OTHER PUBLICATIONS

PCT International Search Report & Written Opinion Corresponding to PCT/US2018/053457 on Jun. 24, 2019.
PCT Written Opinion Corresponding to PCT/US2018/053457 on Oct. 26, 2020.
Domanico, European Space Agency Wants to 3D-Print a Moon Base, CNET, Nov. 6, 2014, 10 Pages. https://www.cnet.com/news/the-european-space-agency-wants-to-3d-print-a-moon-base/.
Ghidini, The Use of 3D Printing for Space Applications, Room Space Journal of Asgardia, Issue 1, No. 7, 2016, 5 Pages. https://room.eu.com/article/the-use-of-3d-printing-for-space-applications.
Halterman, 3D Printing on a Inflatable Substrate, 3DPrint.com, Jun. 17, 2015, 5 Pages https://3dprint.com/73830/3d-printing-on-inflatable/.
Korovkin, Mobile Offshore Wind Turbine, Master's Thesis in Offshore Technology, 2012, 97 Pages. https://uis.brage.unit.no/uis-xmlui/handle/11250/182884.
Sellami et al., 3D Finite Volume Model for Free and Forced Vibrations Computation in On-Shore Wind Turbines, 2016 7th International Conference on Sciences of Electronics, Technologies of Information and Telecommunications (SETIT), Hammamet, Dec. 18-20, 2016, pp. 104-108.

* cited by examiner

METHOD FOR MANUFACTURING A TELESCOPING WIND TURBINE TOWER STRUCTURE

FIELD

The present disclosure relates in general to wind turbine towers, and more particularly to methods of additively manufacturing telescoping wind turbine tower structures.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

In view of the foregoing, the art is continually seeking improved methods for manufacturing wind turbine towers. Accordingly, the present disclosure is directed to methods for manufacturing wind turbine tower structures that address the aforementioned issues. In particular, the present disclosure is directed to methods for additively manufacturing telescoping wind turbine tower structures.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure of a wind turbine. The method includes printing, via an additive printing device, a plurality of concentric sections of the tower structure of the wind turbine and raising an inner section of the plurality of concentric sections to position a bottom portion of the inner section proximate a top portion of an adjacent outer section of the plurality of concentric sections. The method further includes joining the inner section of the plurality of concentric sections to the adjacent outer section of the plurality of concentric sections.

In one embodiment, the present disclosure may be directed to a method for manufacturing a structure. The method includes printing, via an additive printing device, a plurality of concentric sections of the structure and raising an inner section of the plurality of concentric sections to position a bottom portion of the inner section proximate a top portion of an adjacent outer section of the plurality of concentric sections. The method further includes joining the inner section of the plurality of concentric sections to the adjacent outer section of the plurality of concentric sections.

According to another embodiment, a method for manufacturing a tower structure of a wind turbine is provided. The method includes printing, via an additive printing device, a plurality of concentric sections of the tower structure of the wind turbine, wherein a gap is defined between adjacent sections of the plurality of concentric sections. The method further includes positioning an inflatable bladder within the gap and inflating the inflatable bladder by filling the inflatable bladder with a fluid or a gas. The method further includes printing, via an additive printing device, at least one flange on the inflatable bladder and deflating and removing the inflatable bladder after the at least one flange has solidified.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine towers using automated deposition of cementitious materials via technologies such as additive manufacturing, 3-D Printing, spray deposition, extrusion additive manufacturing, concrete printing, automated fiber deposition, as well as other techniques that utilize computer numerical control and multiple degrees of freedom to deposit material. More specifically, methods of the present disclosure include printing nested, concentric sections of wind turbine towers out of concrete using additive manufacturing, which provide adequate structural characteristics for additive tower technology.

The present disclosure may also include raising and joining the concentric sections to form the wind turbine tower. The concentric sections of the tower may be formed from any suitable material or materials and may have any suitable cross sectional shape or profile. In addition, the concentric sections may include internal support structures, such as tensioning cables or reinforcing fibers or rings to provide structural support to the tower structure. The concentric sections may also be printed and assembled in a manner that permits the formation of various overhanging structures such as mounting flanges, openings for doors, wiring conduits, and other features.

Thus, the methods described herein provide many advantages not present in the prior art. For example, the concentric sections may be printed on-site and may have any desirable size (e.g., greater than five meters in diameter), thereby enabling the construction of larger tower structures and wind turbines. In addition, by building portions of the wind tower in telescoping sections positioned in a "compressed" state, it is possible to install the turbine nacelle and rotor using a significantly shorter crane, thus reducing the cost of the crane required to install the tower. In addition, aspects of the present subject matter overcome various other manufacturing and logistics constraints related to prior techniques of forming tower structures for wind turbines and other applications.

Figure 1:
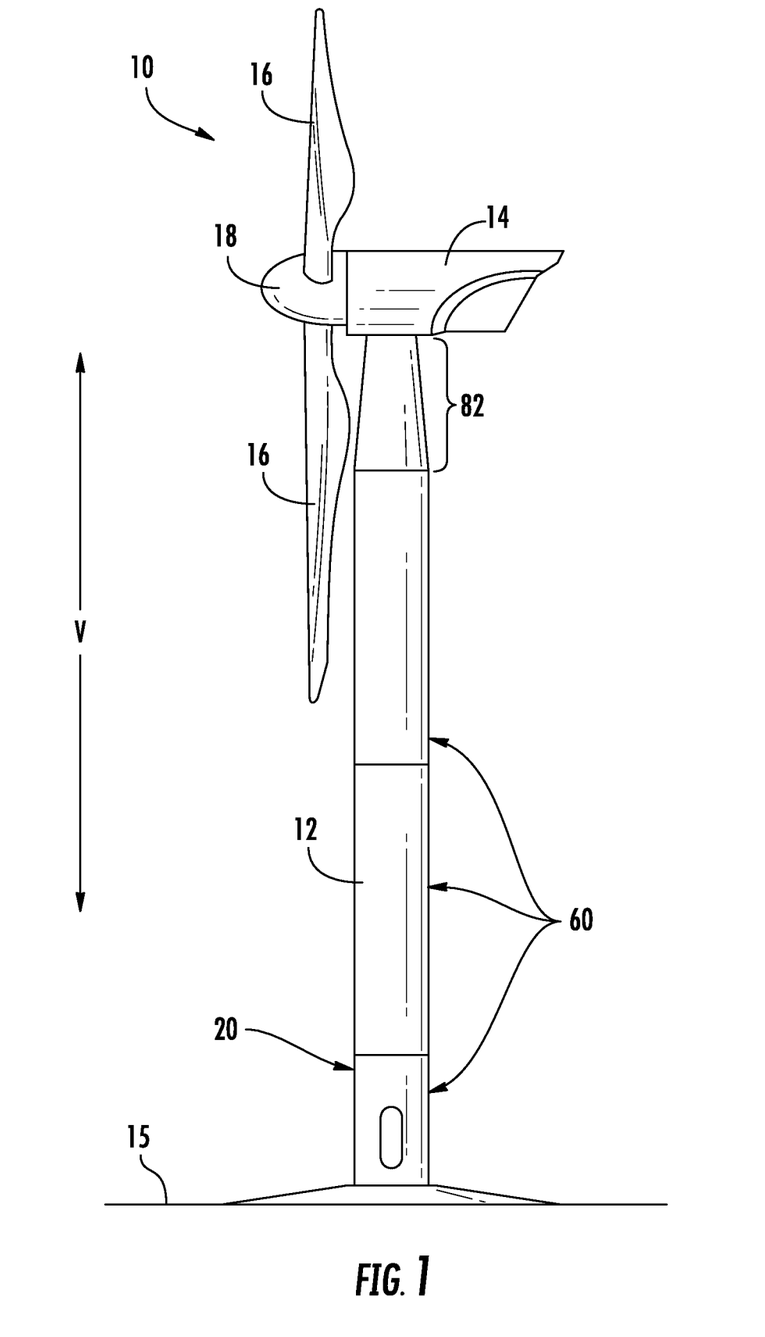
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall tower structures in addition to wind towers, including for example homes, bridges, tall towers, and other aspects of the concrete industry. Further, the methods described herein may also apply to manufacturing any similar structure that benefits from the advantages described herein.

Figure 2:
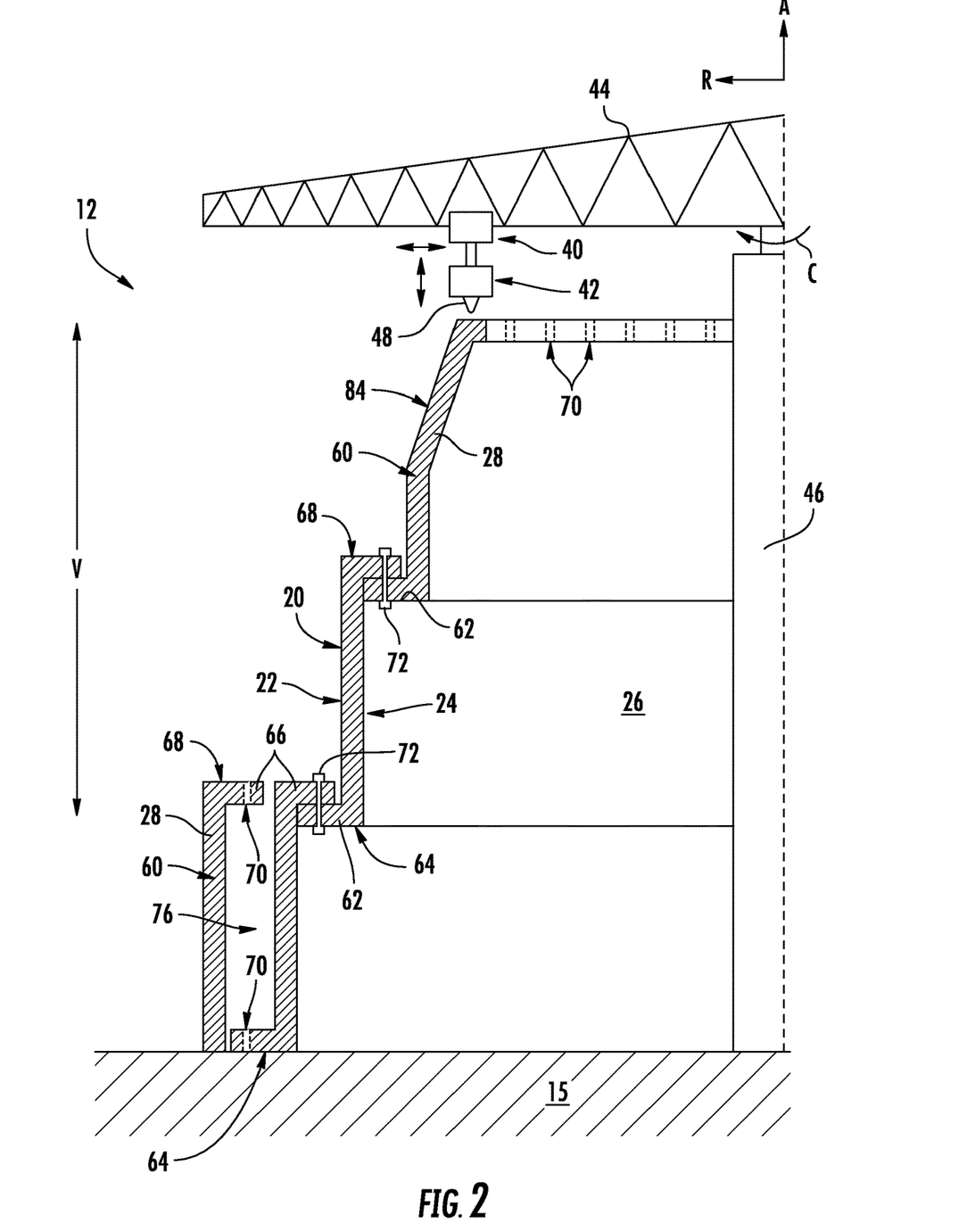
FIG. 2 illustrates a cross-sectional view of one embodiment of a tower structure of a wind turbine according to the present disclosure with inner sections in an extended position and outer sections in a retracted position.

Referring now to FIG. 2, tower structure 12 of a wind turbine 10 will be described in more detail according to an exemplary embodiment of the present subject matter. Specifically, FIG. 2 illustrates a partial, cross-sectional view of one embodiment of the tower structure 12 of the wind turbine 10 according to the present disclosure. As shown, the tower structure 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.). In addition, as will be described in more detail below, the tower structure 12 is formed using additive manufacturing.

Moreover, as shown, the tower structure 12 is formed of a cementitious material 28 that is reinforced with one or more tensioning cables 30 (FIG. 6), such as elongated cables or wires, helical cables or wires, reinforcing bars (also referred to as rebar), and/or mesh. Alternatively, reinforcing fibers (metallic or polymer) or rings or other shapes as may be used to impart strength to the structure. These tensioning cables 30 may be embedded in the cementitious material 28 during the printing process, as described in more detail below. As used herein, the cementitious material 28 may include any suitable workable paste that is configured to bind together after curing to form a structure. Suitable cementitious materials include, for example, concrete, pitch resin, asphalt, clay, cement, mortar, cementitious compositions, or similar materials or compositions.

According to exemplary embodiments of the present subject matter, an adhesive material (not shown) may be provided between one or more of the cementitious material 28 and the foundation 15, the cementitious material 28 and tensioning cables 30, or multiple layers of the cementitious material 28 and tensioning cables 30. Thus, the adhesive material may further supplement interlayer bonding between materials.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

Referring now generally to FIGS. 2 through 6, an additive printing device 40 will be described according to an exemplary embodiment of the present subject matter. Notably, all or part of tower structure 12 may be printed, layer-by-layer, using additive printing device 40, which may use any suitable mechanisms for depositing layers of additive material, such as concrete, to form tower structure 12. Thus, aspects of the present subject matter are directed to methods for manufacturing wind turbine towers via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

It should be understood that the additive printing device 40 described herein generally refers to any suitable additive printing device having one or more nozzles for depositing material (such as the cementitious material 28) onto a surface that is automatically controlled by a controller to form an object programmed within the computer (such as a CAD file). More specifically, as shown, additive printing device 40 includes one or more print heads 42 slidably mounted on a cantilevered support arm 44. Cantilevered support arm 44 may be mounted on a central support 46 which extends along the axial direction A (e.g., parallel to vertical direction V) within interior 26 of tower structure 12. Support arm 44 may be fixed at a vertical location on central support 46 or may move vertically along central support 46 to move print heads 42 vertically as successive layers are added to tower structure 12.

Although FIGS. 2 through 6 illustrate additive printing device 40 as including a central support 46 extending through the interior 26 of tower structure 12 and a support arm 44 for suspending one or more print heads 42, it should be appreciated that additive printing device may be configured to use other machines, systems, or support mechanisms to support print heads 42 during the printing of tower structure 12. For example, four support towers may be positioned outside of tower structure 12 and may include one or more cross beams to form a gantry system for supporting one or more print heads 42. Alternatively, for example, print heads 42 may be mounted to support arm 44 by a cable system to permit vertical movement relative to support arm 44. According to still other embodiments, print heads 42 may be supported and positioned by a system of guide wires, positioning arms, etc.

Figure 3:
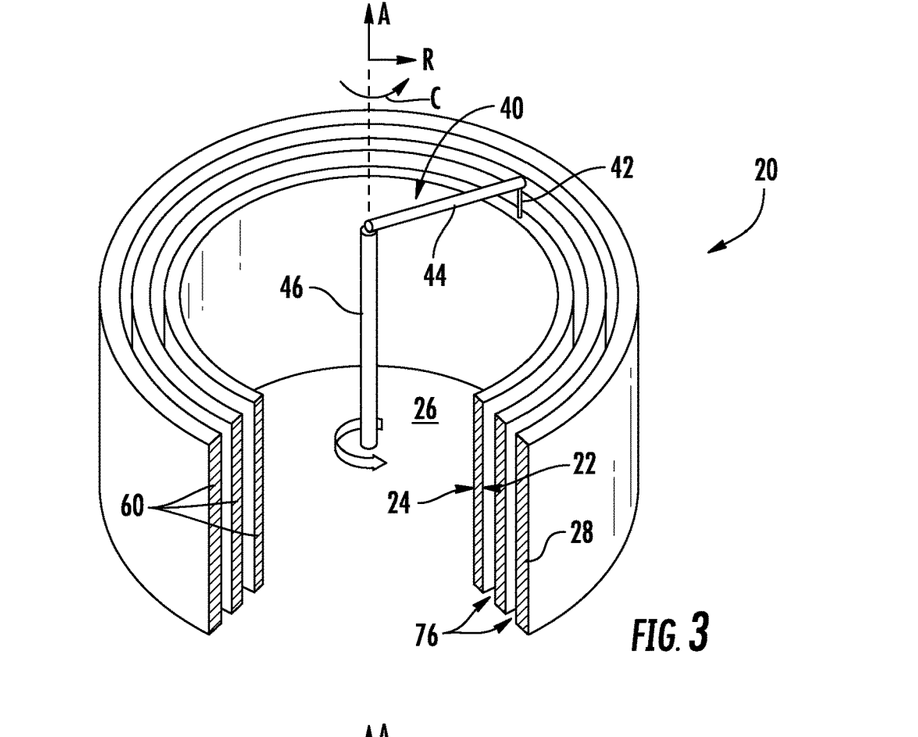
FIG. 3 illustrates a perspective view of one embodiment of a tower structure of a wind turbine and an additive printing device according to the present disclosure.
Figure 4:
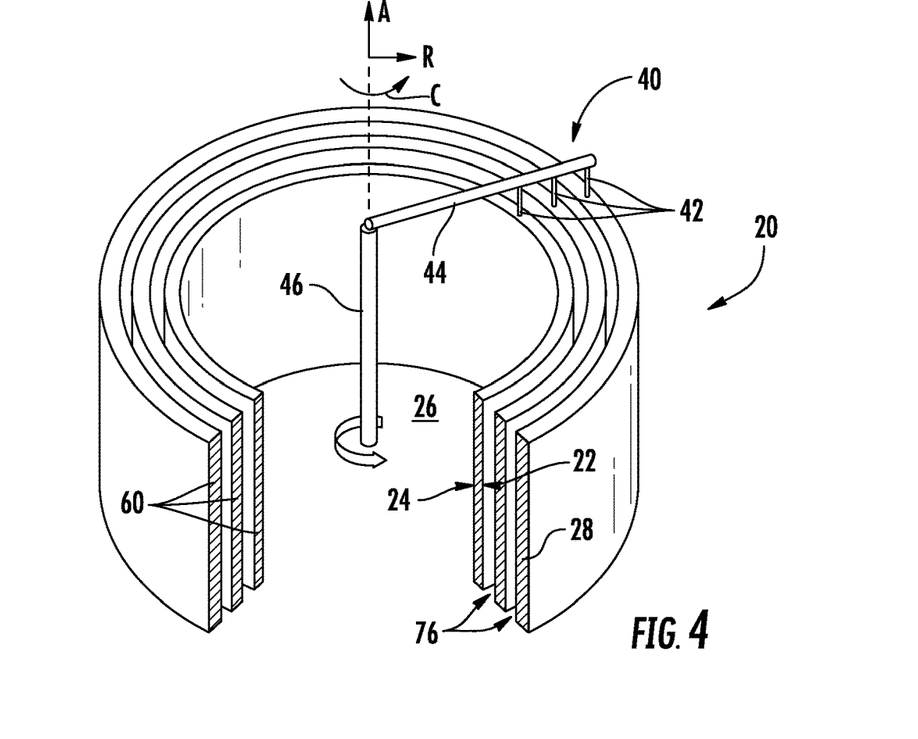
FIG. 4 illustrates a perspective view of another embodiment of a tower structure of a wind turbine and an additive printing device according to the present disclosure.
Figure 5:
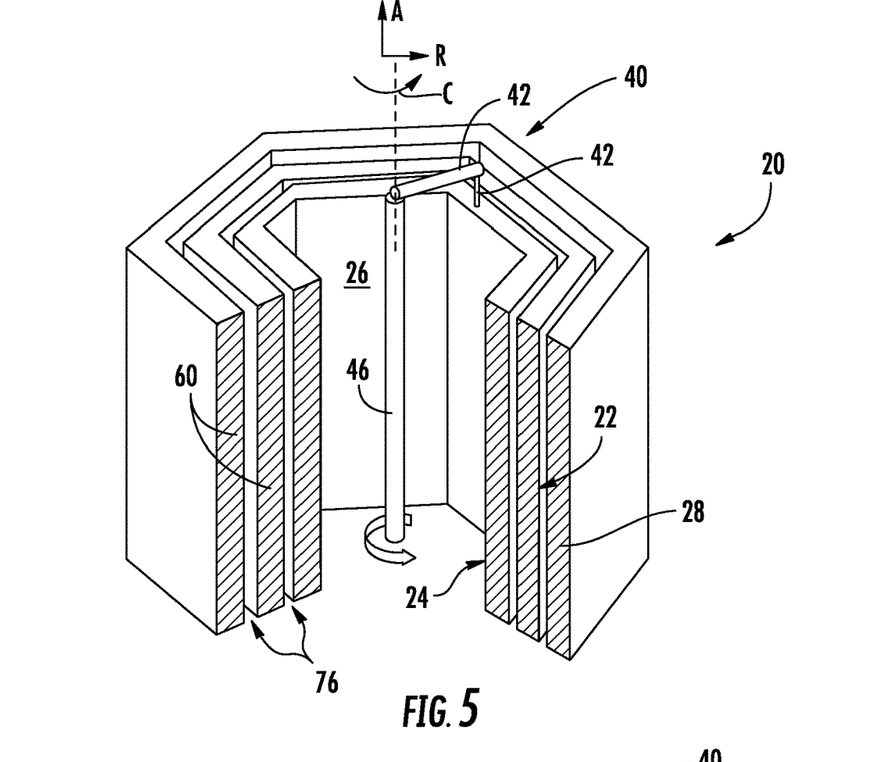
FIG. 5 illustrates a perspective view of another embodiment of a tower structure of a wind turbine and an additive printing device according to the present disclosure.

In addition, each of the one or more print heads 42 may be mounted on a dedicated support arm 44 and may include one or more one or more nozzles 48 for depositing various materials. For example, as shown in FIGS. 2 and 3, print head 42 includes a single nozzle 48 for depositing concrete layer by layer. By contrast, as shown in FIG. 4, print head 42 includes three nozzles 48 spaced apart along the radial direction R and configured for simultaneously depositing a layer of concrete on each of a plurality of concentric sections 60 (described below). According to alternative embodiments, additive printing device 40 may include any number of support arms 44 for supporting any number of print heads 42 including any number of nozzles 48.

During the printing process, various components, supports, and other features may be printed into or included in the cementitious material 28 used to print tower structure 12. For example, according to the exemplary embodiment, the printing process may include embedding one or more tensioning cables 30 at least partially within one or more of portions of tower structure 12. In this regard, as shown for example in FIG. 6, additive printing device 40 may include a cable supply module 50 that positions tensioning cable 30 at least partially within tower structure 12. It should be understood that such cables 30 may extend along the entire height of the tower 12 or along only a portion of the tower height. Furthermore, it should be appreciated that the orientation of tensioning cable 30 is illustrated only to explain aspects of cable supply module 50. It is not necessarily intended that the tensioning cable 30 will have the same size or length. In addition, the position, orientation, and configuration of tensioning cables 30 may vary while remaining within the scope of the present subject matter.

Figure 6:
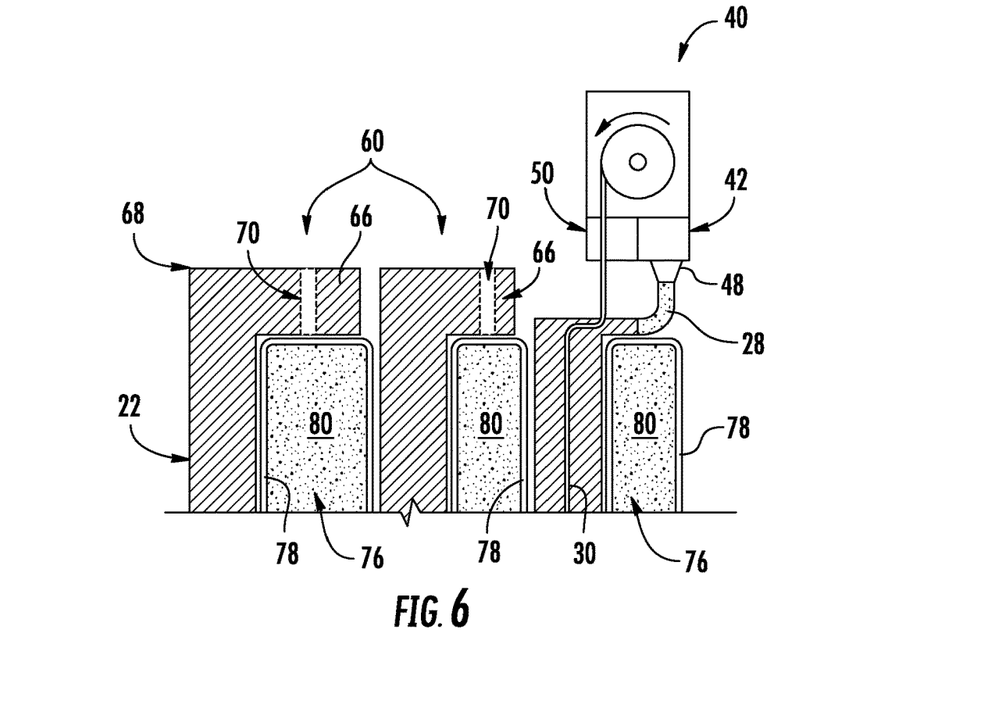
FIG. 6 illustrates a cross sectional view of upper flanges of concentric sections of a wind tower supported by an inflatable bladder according to an exemplary embodiment of the present subject matter.

According to an exemplary embodiment, as the tower structure 12 is being built up, the additive printing device 40 can alternate between depositing tensioning cables 30 using cable supply module 50 and printing the cementitious material 28 using nozzles 48. Alternatively, as illustrated in FIG. 6, cable supply module 50 may be positioned adjacent nozzle 48 and configured for unwinding or unrolling tensioning cable 30 or rebar into the print area prior to depositing cementitious material 28 such that the tensioning cable becomes embedded within or printed over with cementitious material 28. Alternatively, additive printing device 40 may include any other suitable features for compressing or embedding tensioning cable 30 into cementitious material 28 before it has solidified or cured. In alternative embodiments, the additive printing device 40 is configured to eject the cementitious material 28 with short polymer and/or metallic fibers or rings as reinforcements to improve the structural strength of the tower structure 12.

Tensioning cables 30 may generally be configured for ensuring that the stresses in the cementitious material 28, e.g., concrete, may remain largely compressive. These cables 30 may be pretensioned and cementitious material 28 may be printed around the cables 30 or the printing process may define holes throughout tower structure 12 through which tensioning cables 30 may be placed after curing, and thereafter post-tensioned. In alternative embodiments, the additive printing device 40 may be configured to provide tension to the cable(s) 30 during printing of the tower structure 12. In such embodiments, additive printing device 40 may vary a tension of the one or more cables 30 as a function of a cross-section of the tower structure 12 during the printing process. Thus, such tensioning cables 30 are configured to manage tensile stresses of the tower structure 12.

In another embodiment, the tower structure 12 may include, for example, a plurality of reinforcing bars that form a metal mesh (not shown) arranged in a cylindrical configuration to correspond to the shape of the tower structure 12. Further, the cylindrical metal mesh can be embedded into the cementitious material 28 of the tower structure 12 before the material 28 cures and periodically along the height of the tower 12. In addition, the additive printing device 40 is configured to print the cementitious material 28 in a manner that accounts for the cure rate thereof such that the tower wall 20, as it is being formed, can bond to itself. In addition, the additive printing device 40 is configured to print the tower structure 12 in a manner such that it can withstand the weight of the wall 20 as the additively-formed cementitious material 28 can be weak during printing.

As best illustrated in FIG. 2, tower structure 12, or more specifically, tower wall 20, includes a plurality of concentric sections 60 which are generally nested within each other and are configured for moving between an extended position (i.e., a "raised" position) and a retracted position (i.e., a "lowered" position). In this regard, tower structure 12 may be printed using additive printing device 40 with all of the plurality of concentric sections 60 positioned in the lowered position, such that a large crane is not required to position separately formed sections at a full height of the tower structure 12.

Notably, the concentric sections 60 of the tower structure 12 may be printed in any suitable manner and in any suitable order. For example, as illustrated in FIGS. 2 and 3, a single print head 42 may traverse the profile of each of concentric sections 60, depositing a layer of cementitious material 28 around an entire perimeter of that concentric section 60. According to one embodiment, each concentric section 60 may be printed separately, e.g., starting at a bottom of that concentric section 60 and finishing at a top of that concentric section 60 before proceeding to the next concentric section 60. According to alternative embodiments, print head 42 may move sequentially around a profile of each concentric section 60 to print a layer on each before returning to print a second layer.

By contrast, as shown in FIG. 4, additive printing device 40 may include a plurality of print heads 42, each configured for depositing a layer of additive material (e.g., cementitious material 28) to concentric sections 60 simultaneously. In this regard, for example, in the case of cylindrical tower structure 12 having circular cross-sections, additive printing device 40 may include three print heads 42 that remain in a fixed radial position on support arm 44. During printing, print heads 42 deposit cementitious material 28 while central support 46 rotates about its central axis (i.e., the axial direction A) to simultaneously print a layer of each of concentric section 60.

In order to raise the tower structure 12 to its proper height, each of the plurality of concentric sections 60 may be moved to the extended position and fixed together using any method known in the art. For example, any suitable jacking system, cable lifting system, hydraulic lifting system, or any other suitable method may be used to sequentially lift and join adjacent sections. According to still other embodiments, a crane or other lift system may be used to raise concentric sections 60.

Notably, adjacent concentric sections 60 may be joined together when in the raised position using any suitable device or mechanism. For example, according to the illustrated embodiment additive printing device 40 may print circumferential flanges on outer wall 22 and/or inner wall 24 of concentric sections 60. More specifically, each concentric section 60 may include a lower flange 62 defined proximate a bottom portion 64 of that concentric section 60 that extends outward substantially along a radial direction R from a radially outer wall 22 of concentric section 60. In addition, each concentric section 60 may include an upper flange 66 defined proximate an upper portion 68 of that concentric section 60 that extends inward substantially along the radial direction R from a radially inner wall 24 of concentric section 60. In this manner, concentric sections 60 may slide vertically relative to each other until lower flange 62 of an inner concentric section 60 engages upper flange 66 of an adjacent outer concentric section 60.

Lower flange 62 and upper flange 66 may be fixed together or joined using any suitable method of device. For example, according to the illustrated embodiment, lower flange 62 and upper flange 66 are printed to define a plurality of holes 70 configured for receiving mechanical fasteners 72. In this manner, mechanical fasteners 72, such as bolts, may be using to secure concentric sections 60 in the raised positioned after being lifted by any suitable lifting mechanism (as described above).

As best illustrated in FIGS. 2 and 6, concentric sections 60 are printed such that they are spaced apart along the radial direction R to define a gap 76 between adjacent concentric sections 60. Gap 76 generally facilitates the telescoping movement of concentric sections 60 during the process of raising tower structure 12. In addition, lower flange 62 and upper flange 66 are positioned within gap 76.

Notably, the additive manufacturing process generally requires vertical support for each layer of additive material deposited. Therefore, when features are printed that protrude from the vertical wall of concentric sections 60, or at least extend at an angle greater than 45 degrees, additive printing device 40 requires features for supporting deposited material during the build process. In this regard, "flanges" or "overhanging structures" are intended to refer to printed portions of concentric sections which extend into gap 76 between adjacent sections at an angle which would otherwise not have support during the additive manufacturing process (e.g. an angle greater than 45 degrees).

According to an exemplary embodiment, the printing of overhangs such as upper flange 66 within gap 76 may include positioning a temporary support structure within gap 76 to support upper flange 66. According to exemplary embodiments, the temporary support structure is an inflatable bladder 78 that may be filled with a fluid or gas 80 to provide vertical support upon which cementitious material 28 may be deposited until cured. After the cementitious material 28 cures or otherwise solidifies sufficiently to support itself, the gas or fluid 80 may be released from the inflatable bladder 78, thereby deflating the inflatable bladder 78, which may then be removed from tower structure 12 altogether.

Although FIG. 2 illustrates all of concentric sections 60 as being printed from a single material, e.g., concrete, it should be appreciated that each concentric section 60 may be printed using any suitable material, even if different from other sections. In addition, each concentric section 60 may have any suitable cross sectional profile (e.g., as taken along an axial direction A), profile (e.g., as defined along the axial direction A), and overall height (e.g., measured along the vertical direction V). For example, referring again briefly to FIG. 1, tower structure 12 may be formed from a plurality of lower sections, e.g., similar to concentric sections 60. However, tower structure 12 may also include one or more upper sections, such as top section 82. According to an exemplary embodiment, top section 82 of tower structure 12 may be formed from a different material than concentric section, e.g., steel, and may be configured for directly supporting nacelle 14. In this regard, for example, the innermost concentric section 60 may be configured for receiving top section 82 before concentric sections 60 are raised. Although a single top section 82 is illustrated on top of a plurality of concentric sections 60, it should be appreciated that any suitable number and combination of top sections 82 and concentric sections 60 may be used according to alternative embodiments.

As illustrated in FIGS. 2 through 4, tower structure 12 is constructed of a plurality of concentric sections 60 having a circular cross-sectional profile, e.g., cylindrical concentric sections 60. However, it should be appreciated that using the printing techniques described herein, each of the plurality of concentric sections may have any suitable cross-sectional shape which may be consistent along a height of the sections or which may vary as needed according to the application. In this regard, as shown in the exemplary embodiment of FIG. 5, concentric sections 60 may have a polygonal cross-sectional shape. According to still other embodiments, concentric sections 60 may be elliptical, oval, square, teardrop, airfoil, or any other suitable shape.

In addition, according to still another embodiment, concentric sections 60 may be tapered or vary in cross-sectional area depending on the vertical position along the concentric section 60. For example, it may be desirable to slightly taper one or more of the plurality of concentric sections 60 such that they are wider at bottom portion 64 than they are at upper portion 68. Specifically, as illustrated in FIG. 2, concentric sections 60 may define one or more tapered portions 84, or portions having any other suitable profile.

Figure 7:
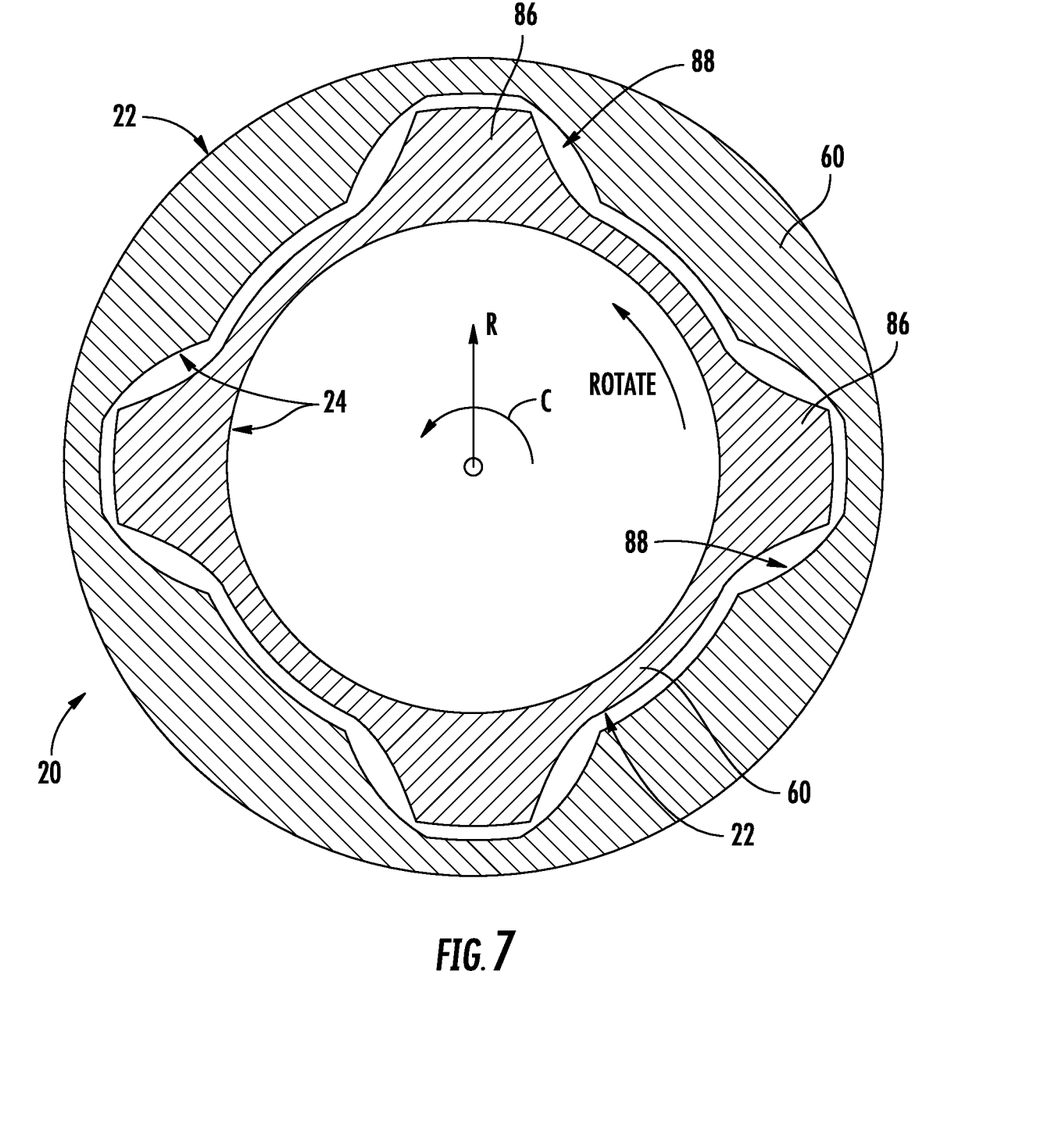
FIG. 7 illustrates a top, cross sectional view of a tower structure including concentric sections defining locking flanges and corresponding recesses according to an exemplary embodiment.

Referring now to FIG. 7, tower structure 12 may define locking features for fixing the relative positions of an inner concentric section 60 and an outer concentric section 60. Specifically, as illustrated, the inner concentric section 60 defines a locking flange 86 extending outward along a radial direction R from a radially outer surface or outer wall 22 of the inner section 60. In addition, an adjacent outer concentric section 60 defines an elongated recess 88 extending along a vertical direction or axial direction A on a radially inner surface or inner wall 24 of the outer section 60. Specifically, as illustrated, tower structure 12 may define a plurality of locking flanges 86 and a plurality of corresponding elongated recesses 88 spaced circumferentially (e.g., about the circumferential direction C) about the respective concentric sections 60. By contrast, according to alternative embodiments, the outer concentric section 60 could define the protruding flange and the inner concentric section 60 could define the elongated recess. Notably, these protruding flanges need not extend along a height of tower structure 12, but might only be present for a short distance sufficient to carry the weight load imposed. In addition, the flanges and recesses may take any shape, number, and configuration according to alternative embodiments.

Notably, after printing concentric sections 60, locking flanges 86 are positioned within the corresponding elongated recesses 88. In addition, during the raising process, locking flanges 86 slide within elongated recesses 88. However, after the inner section is raised out of the outer section, the inner section may be rotated such that the locking flange 86 is no longer aligned with the elongated recess 88. In this manner, the inner section is prevented from collapsing or sliding back into the outer section, thereby simplifying the construction and assembly process.

Figure 8:
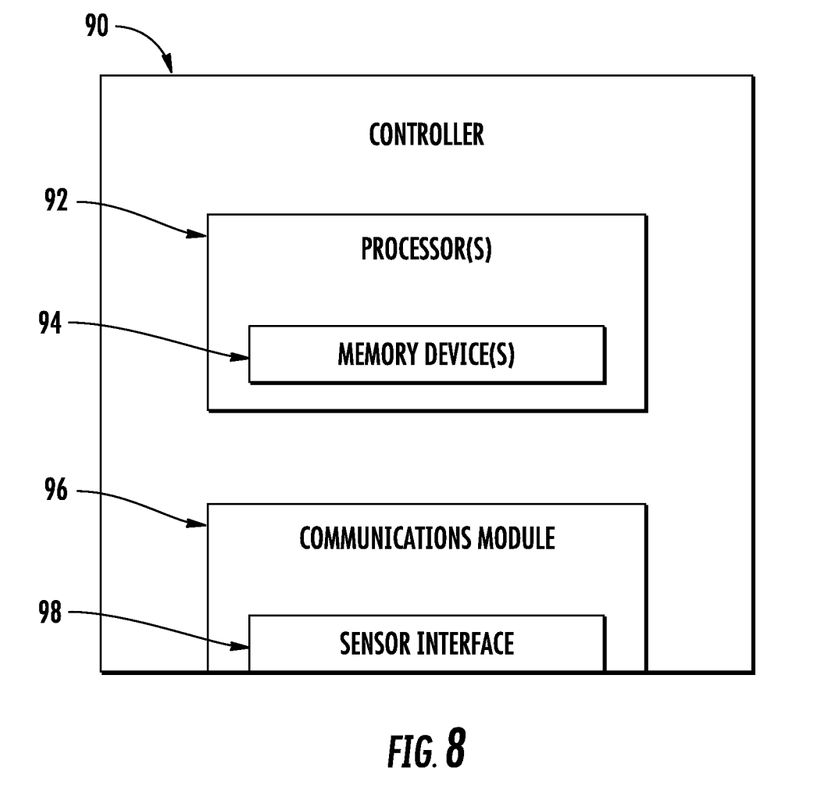
FIG. 8 illustrates a block diagram of one embodiment of a controller of an additive printing device according to the present disclosure.

Referring now to FIG. 8, a block diagram of one embodiment of the controller 90 of the additive printing device 40 is illustrated. As shown, the controller 90 may include one or more processor(s) 92 and associated memory device(s) 94 configured to perform a variety of computer-implemented functions (e.g., performing the methods, steps, calculations and the like and storing relevant data as disclosed herein). Additionally, the controller 90 may also include a communications module 96 to facilitate communications between the controller 90 and the various components of the additive printing device 40. Further, the communications module 96 may include a sensor interface 98 (e.g., one or more analog-to-digital converters) to permit signals transmitted from one or more sensors or feedback devices to be converted into signals that can be understood and processed by the processors 92. It should be appreciated that these sensors and feedback devices may be communicatively coupled to the communications module 96 using any suitable means, e.g., via a wired or wireless connection using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 92 is also configured to compute advanced control algorithms and communicate to a variety of Ethernet or serial-based protocols (Modbus, OPC, CAN, etc.). Additionally, the memory device(s) 94 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 94 may generally be configured to store suitable computer-readable instructions that, when implemented by the processor(s) 92, configure the controller 90 to perform the various functions as described herein.

Now that the construction and configuration of tower structure 12 and additive printing device 40 have been presented according to an exemplary embodiment of the present subject matter, an exemplary method 100 for manufacturing a tower structure of a wind turbine using an additive printing device is provided. Method 100 can be used to form tower structure 12 using additive printing device 40, or to form any other suitable tower or tall concrete structure using any other suitable additive printing device. In this regard, for example, controller 90 may be configured for implementing method 100. However, it should be appreciated that the exemplary method 100 is discussed herein only to describe exemplary aspects of the present subject matter, and is not intended to be limiting.

Figure 9:
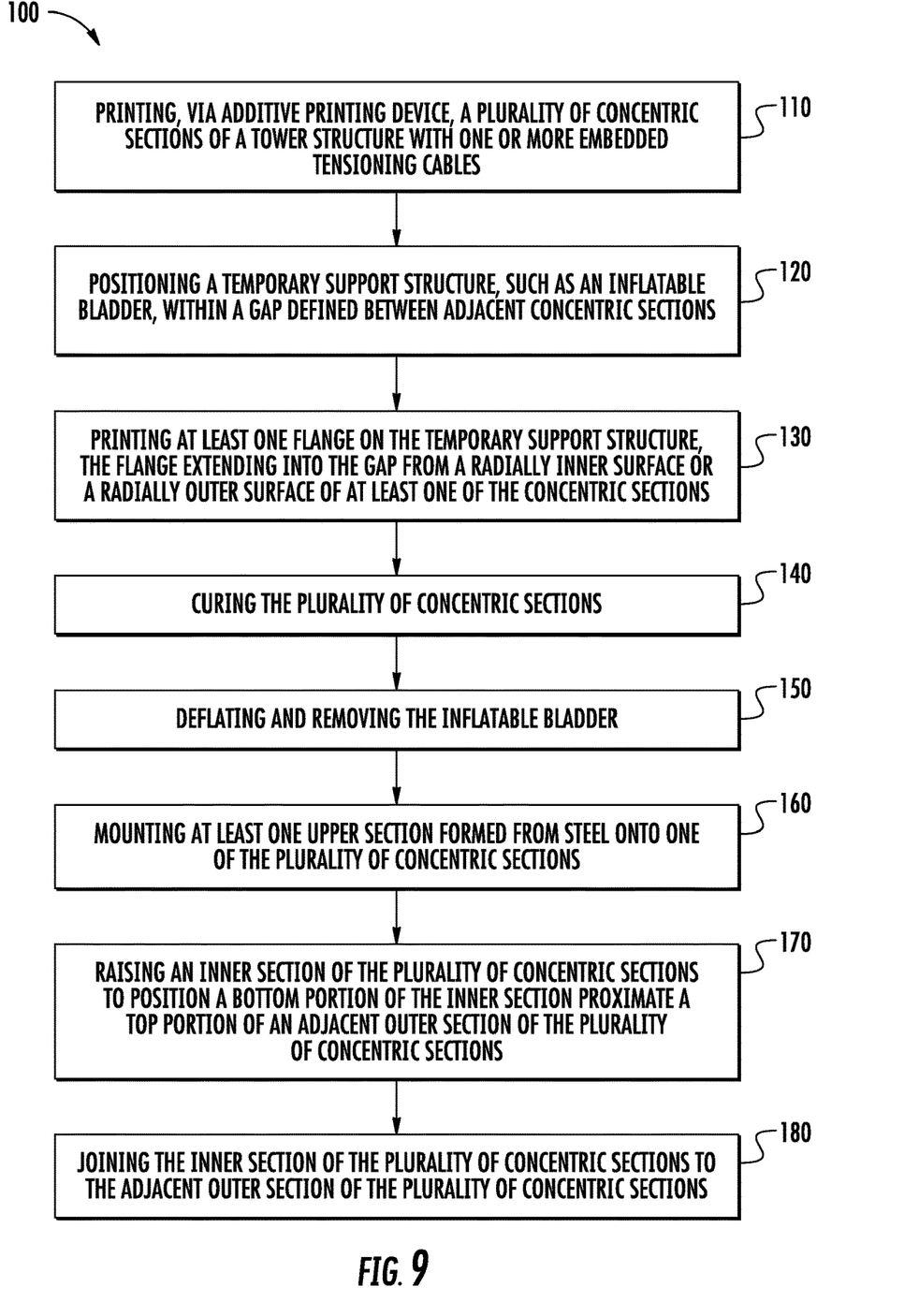
FIG. 9 illustrates a flow diagram of one embodiment of a method for manufacturing a tower structure of a wind turbine according to the present disclosure.

As shown in FIG. 9, method 100 includes, at step 110, printing a plurality of concentric sections of a tower structure of a wind turbine. Specifically, according to exemplary embodiments, the printing process may be performed by an additive printing device which may deposit cementitious material or any other suitable material to build each of the concentric sections from the ground up, as described above. As best illustrated in FIG. 2, the concentric sections of the tower structure may be nested within each other in a compressed or retracted telescoping configuration and may include a variety of internal features, such as tensioning cables, and/or support features, such as flanges.

Steps 120 and 130 are used to print overhanging structures or flanges on one or more of the concentric sections. As illustrated, the printing of such overhangs may include, at step 120, positioning a temporary support structure within the gap defined between the adjacent concentric sections, e.g., to support the upper flange while printing. According to exemplary embodiments, the temporary support structure is an inflatable bladder that may be filled with a fluid or gas to provide vertical support upon which cementitious material may be deposited until cured or otherwise solidified. Furthermore, the inflatable bladder could be used to form doors or other features wherein the cementitious material will ultimately span or extend over an open space within interior 26.

Step 130 includes printing at least one flange (or other overhanging structure) on the inflatable bladder. Step 140 includes curing the plurality of concentric sections, including the overhang, e.g., by waiting until the concrete has solidified. After the mortar cures, the gas or fluid may be released from the bladder at step 150, thereby deflating the inflatable bladder. The inflatable bladder may then be removed from tower structure such that the formed flanges may be joined during the raising process.

Step 160 includes mounting at least one upper section formed from steel onto one of the plurality of concentric sections printed in the prior steps. For example, an upper section may include a cylindrical steel shell supporting nacelle 14 of wind turbine 10. Notably, by mounting the upper section before raising the concentric sections, the height of any crane used to raise the upper section may be minimized.

Step 170 may then include raising an inner section of the concentric sections to position a bottom portion of the inner section proximate a top portion of an adjacent outer section of the concentric sections, e.g., as shown for inner concentric sections 60 in FIG. 2. Step 180 then includes joining the inner section of the plurality of concentric sections to the adjacent outer section, e.g., using a plurality of mechanical fasteners passed through bolt holes defined within the flanges. This process may be repeated until all of the concentric sections have been extended and the tower structure is in the fully extended position.

FIG. 9 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using tower structure 12 and additive printing device 40 as an example, it should be appreciated that these methods may be applied to the operation of additive printing device to form any suitable tower structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a tower structure of a wind turbine, the method comprising:
   printing, via an additive printing device, a plurality of concentric sections of the tower structure of the wind turbine;
   raising an inner section of the plurality of concentric sections to position a bottom portion of the inner section proximate a top portion of an adjacent outer section of the plurality of concentric sections, wherein the inner section of the plurality of concentric sections defines a locking flange extending outward along a radial direction from a radially outer surface and the adjacent outer section of the plurality of concentric sections defines an elongated recess extending along a vertical direction on a radially inner surface, the locking flange being positioned within the elongated recess after printing, wherein raising the inner section of the plurality of concentric sections further comprises sliding the locking flange within the elongated recess;
   rotating the inner section of the plurality of concentric sections after raising the inner section such that the locking flange is no longer aligned with the elongated recess; and
   joining the inner section of the plurality of concentric sections to the adjacent outer section of the plurality of concentric sections.

2. The method of claim 1, wherein a gap is defined between adjacent sections of the plurality of concentric sections before the adjacent sections are joined.

3. The method of claim 2, wherein each of the plurality of concentric sections comprises:
   at least one flange that extends into the gap from a radially inner surface or a radially outer surface.

4. The method of claim 3, further comprising:
   positioning a temporary support structure within the gap before raising the inner section to support the at least one flange.

5. The method of claim 4, wherein the temporary support structure is an inflatable bladder filled with a fluid or gas.

6. The method of claim 5, further comprising:
   deflating and removing the inflatable bladder after the flange has solidified.

7. The method of claim 1, wherein at least two of the plurality of concentric sections are printed sequentially.

8. The method of claim 1, wherein at least one of the plurality of concentric sections is cylindrical.

9. The method of claim 1, wherein at least one of the plurality of concentric sections is tapered toward a top portion of the at least one of the plurality of concentric sections.

10. The method of claim 1, further comprising:
    during printing, embedding one or more tensioning cables at least partially within one or more of the plurality of concentric sections.

11. The method of claim 1, wherein the inner section defines a plurality of locking flanges circumferentially spaced about the radially outer surface of the inner section and the adjacent outer section defines a plurality of corresponding elongated recesses circumferentially spaced about the radially inner surface of the outer section.

12. The method of claim 1, further comprising:
    curing the plurality of concentric sections before raising the inner section of the plurality of concentric sections.

13. The method of claim 1, wherein at least one of the plurality of concentric sections has a diameter of greater than about five (5) meters.

14. The method of claim 1, wherein the plurality of concentric sections are lower concentric sections of the tower structure, the method further comprising:
    mounting at least one upper section onto one of the plurality of concentric sections; and
    extending the plurality of lower sections after mounting the at least one upper section.

* * * * *